United States Patent [19]

Bandoh et al.

[11] 4,296,468
[45] Oct. 20, 1981

[54] ADDRESS CONVERSION UNIT FOR DATA PROCESSING SYSTEM

[75] Inventors: Tadaaki Bandoh; Yasushi Fukunaga, both of Hitachi, Japan

[73] Assignee: Hitachi, Ltd., Tokyo, Japan

[21] Appl. No.: 945,396

[22] Filed: Sep. 25, 1978

[30] Foreign Application Priority Data

Sep. 26, 1977 [JP] Japan .............................. 52/114629

[51] Int. Cl.³ .............................................. G06F 9/20
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,597,745 | 8/1971 | Lahrson | 364/900 |
| 3,657,705 | 4/1972 | Mekota, Jr. et al. | 364/200 |
| 3,737,867 | 6/1973 | Cavin et al. | 364/200 |
| 3,943,495 | 3/1976 | Garlic | 364/200 |
| 3,967,104 | 6/1976 | Brantingham et al. | 364/900 |
| 3,976,978 | 8/1976 | Patterson et al. | 364/200 |
| 4,031,514 | 6/1977 | Kihara | 364/200 |
| 4,047,247 | 9/1977 | Stanley et al. | 364/200 |
| 4,079,451 | 3/1978 | Woods et al. | 364/200 |
| 4,093,995 | 6/1978 | Smith et al. | 364/900 |

*Primary Examiner*—Gareth D. Shaw
*Attorney, Agent, or Firm*—Craig and Antonelli

[57] ABSTRACT

An address conversion method and unit for a data processing system is disclosed which converts logical addresses into physical addresses representative of plural addressable storage locations. Each instruction includes a portion indicative of a first or second kind of instruction. In the case where an instruction is of the first kind, the content of a register in a first base register arrangement specified by the instruction is added with an address part of the instruction to produce a logical address. In the case where an instruction is of the second kind, on the other hand, the content of a register in a second base register arrangement specified by the instruction different from the first base register arrangement is juxtaposed with an address part of the instruction to produce a logical address.

5 Claims, 8 Drawing Figures

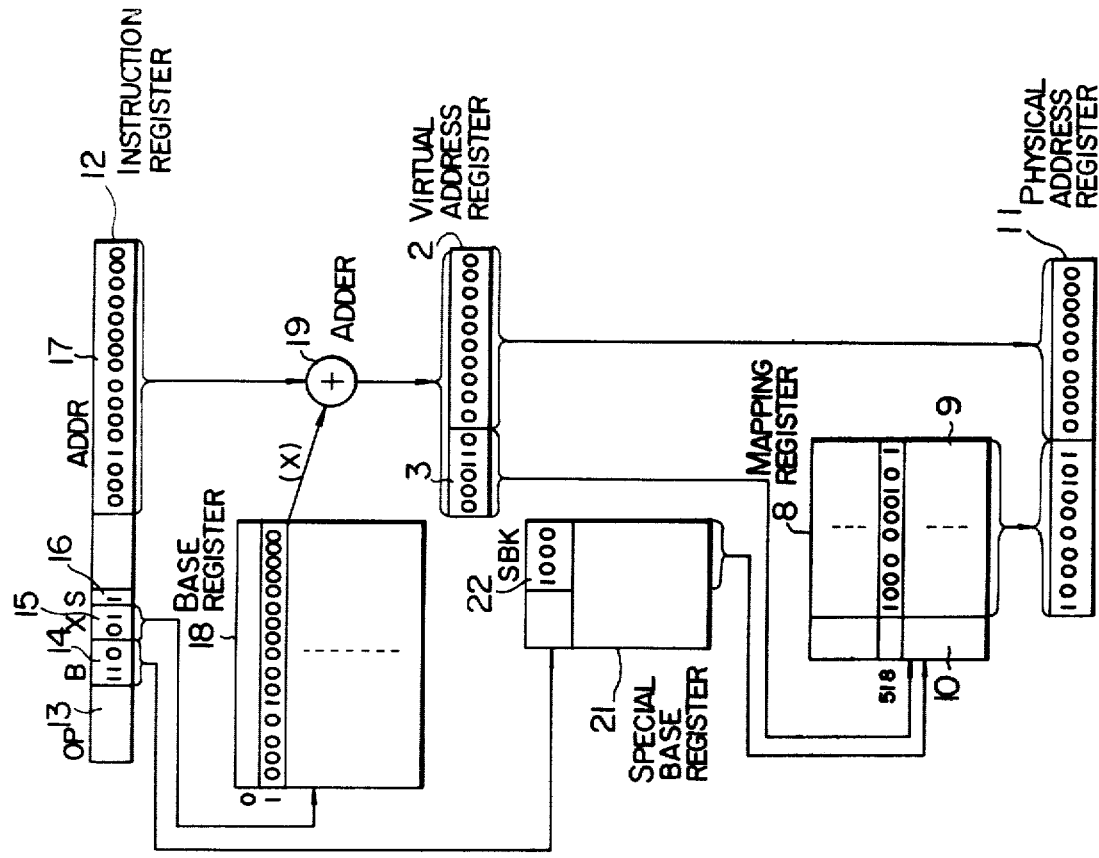
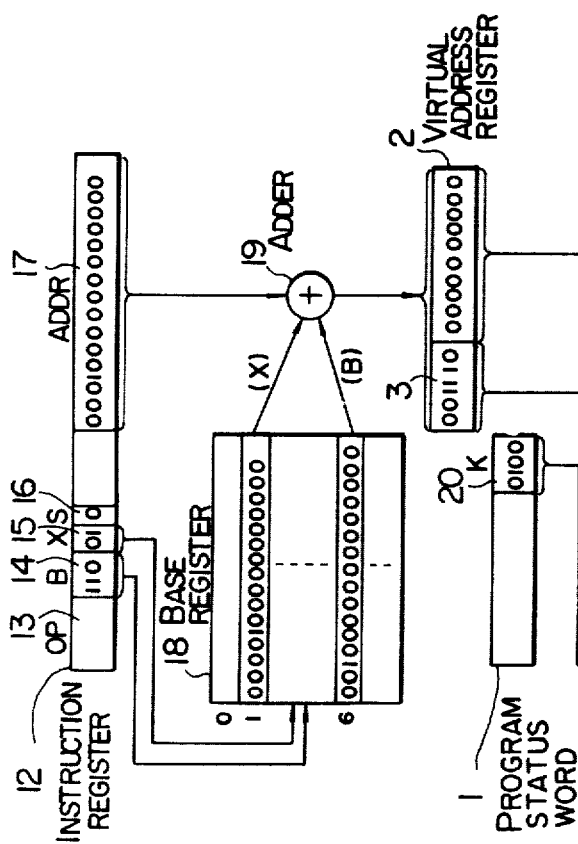

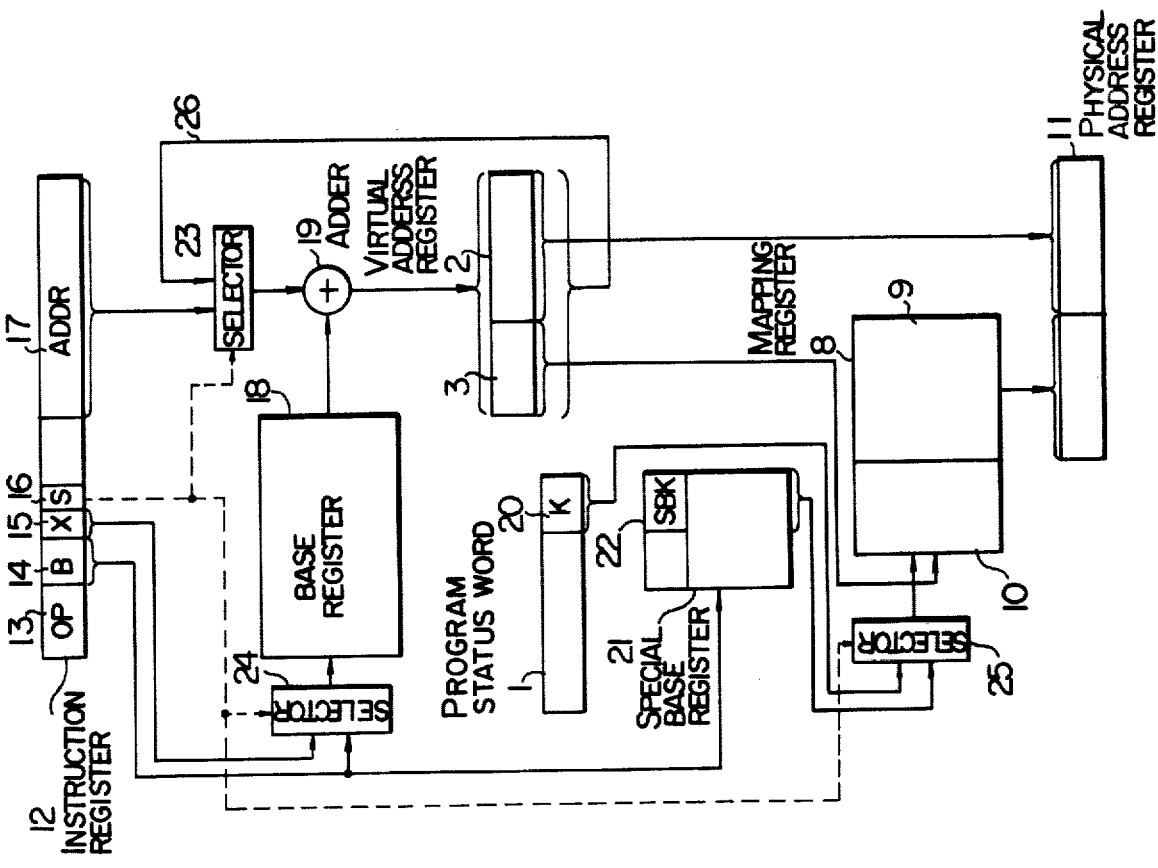
F I G. 7
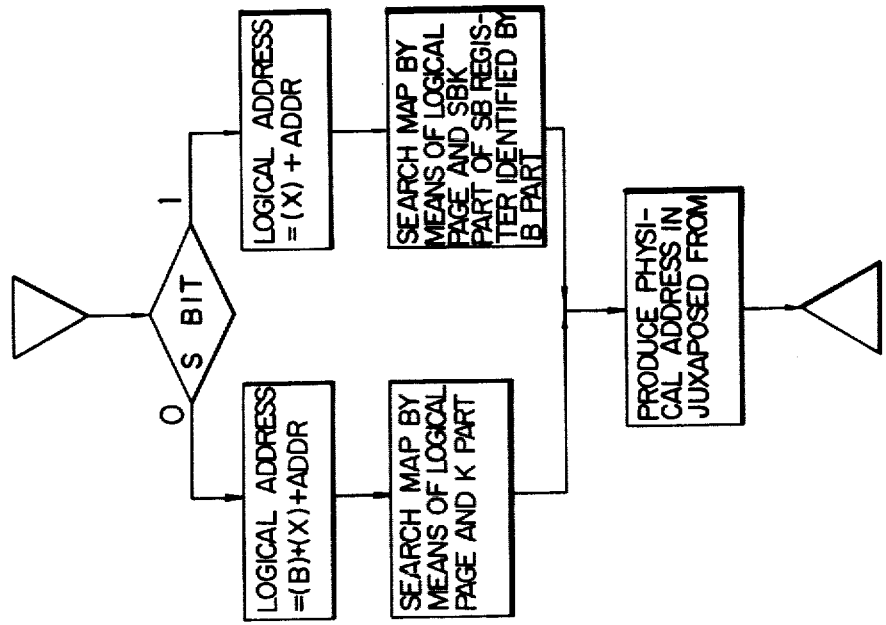
F I G. 6

ADDRESS CONVERSION UNIT FOR DATA PROCESSING SYSTEM

BACKGROUND OF THE INVENTION

The present invention relates to a virtual addressing technique for converting logical addresses into physical addresses representative of a plurality of addressable storage locations in a data processing system and more particularly to such a technique which may be suitable for the case where the bit length of a virtual or logical address is shorter than that of a physical address as in a minicomputer.

In so-called minicomputers in which a virtual or logical address is written with 16 bits, only $2^{16}(=64K)$ words or locations can be addressed directly. In recent minicomputers, the 16-bit virtual address is converted into, for example, a 20-bit physical address through a mapping mechanism so as to obtain a physical space of about 1M words. Such a computer is generally called "Mega Mini" (referring to a minicomputer having a memory of mega byte capacity). Though the number of physical addresses can be thus increased, there is a restriction that the number of virtual addresses can be no greater than 64K. Examples of the conversion of virtual addresses into physical addresses and details of the mapping mechanism are shown in various references. For example, one can make reference to IBM GA34-0021-0 SERIES/1 Model 5 4955 Processor and Processor Features Description, published on November, 1976, especially, pages 2-17 to 2-24 (disclosing Effective Address Generation) and pages 9-3 (describing Relocation Addressing and showing an Address Translation Example in FIG. 9-1); and the Gray et al U.S. Pat. No. 3,854,126 issued on Dec. 10, 1974 and entitled "CIRCUIT FOR CONVERTING VIRTUAL ADDRESSES INTO PHYSICAL ADDRESSES" which discloses the need for address expansion and the conversion of a 16-bit virtual address into a 18-bit physical address.

In operating systems (or executive programs) or control applications, a space larger than 64K words must be sometimes treated as a common area between tasks on the basis of one program. In such a case, it was necessary to change the setting of the map. This is inefficient as well as laborious in that the programming must be made taking account of which map is now used.

SUMMARY OF THE INVENTION

An object of the present invention is to provide an address conversion method and unit for use in a data processing system in which the above-described problem of inefficiency and labor is eliminated.

In accordance with the present invention, each instruction includes a portion indicative of a first or second kind of instruction. In the case where an instruction is of the first kind, the content of a register in a first base register arrangement specified by the instruction is added with an address part of the instruction to produce a virtual or logical address. Part of this virtual address along with part of the program status word is used to address a mapping register, the contents of which are juxtaposed with the address part of the instruction. In the case where an instruction is of the second kind, on the other hand, the content of a register in a second base register arrangement which is specified by the instruction and which is different from the first base register arrangement is used to address the mapping register, the contents of which are juxtaposed with the address part of the instruction to produce the expanded physical address. In this way, reference to the program status word is avoided for the second kind of instruction.

The above and other objects and features of the present invention will be apparent from the following description in conjunction with the accompanying drawings.

BRIEF DESCRIPTION OF THE DRAWINGS

FIGS. 4 and 5 are block diagrams for explaining a usual addressing and an expanded addressing employed in the present invention, respectively;

FIG. 6 shows in flow chart the functions of the block diagrams of FIGS. 4 and 5;

FIG. 7 is a circuit arrangement as an embodiment of the present invention for realizing the functions intended in FIGS. 4 and 5.

DESCRIPTION OF THE PREFERRED EMBODIMENTS

Prior to presenting a description of preferred embodiments of the present invention, virtual addressing as conventionally used in 16-bit minicomputers will be explained with the aid of FIG. 1.

Figure 1:
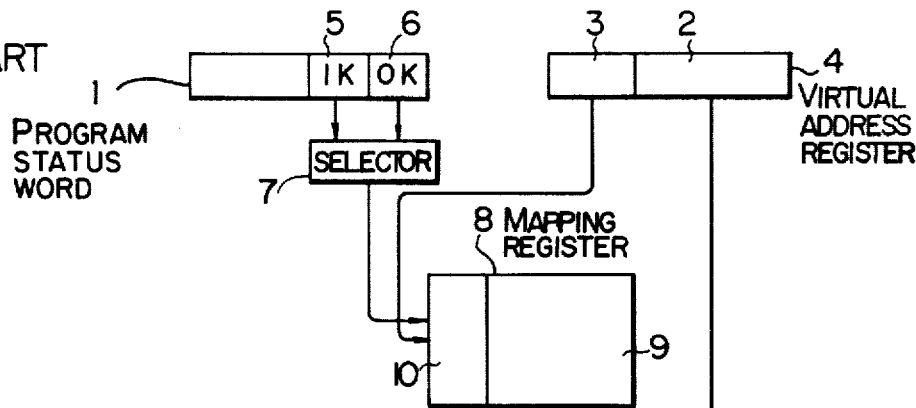
FIG. 1 is a block diagram for explaining a virtual addressing conventionally used in minicomputers.

In FIG. 1, reference numeral 1 designates a program status word (hereinafter referred to as PSW) which forms an internal register in a CPU denoting the state of the computer at a moment in time. An instruction key (IK) part 5 and an operand key (OK) part 6 of the PSW respectively indicate map numbers on a well known mapping mechanism when the required instruction and operand are accessed. A virtual address register 2 contains an upper 6-bit portion 3 called a logical page and a lower 10-bit portion 4 called a displacement. The upper 6-bit portion 3 or logical page of the virtual address register 2 and the IK part 5 or OK part 6 of the PSW selected by a selector 7 are input as an address into a mapping register arrangement 8 having physical pages 9 (i.e. whose contents indicate pages on a physical or real memory space including a plurality of addressable storage locations) and protection bits 10 indicating whether a writing into the memory page is acceptable or not. The lower 10-bit portion 4 of the virtual address indicates a specified location in one page on the physical memory space. The output (10 bits) of the mapping register arrangement 8 and the upper 10-bit portion 4 of the virtual address are juxtaposed to produce a physical address which in turn is temporally stored in a physical address register 11. This address conversion is disclosed in FIG. 9-1 on page 9-3 of the above-mentioned IBM GA34-0021-0 SERIES/1 Model 5 4955 Processor and Processor Features Description. The upper 10-bit portion of the physical address specifies one of the pages on the physical memory space while the lower 10-bit portion of the physical address specifies one location in that specified page on the physical memory space.

Figure 2:
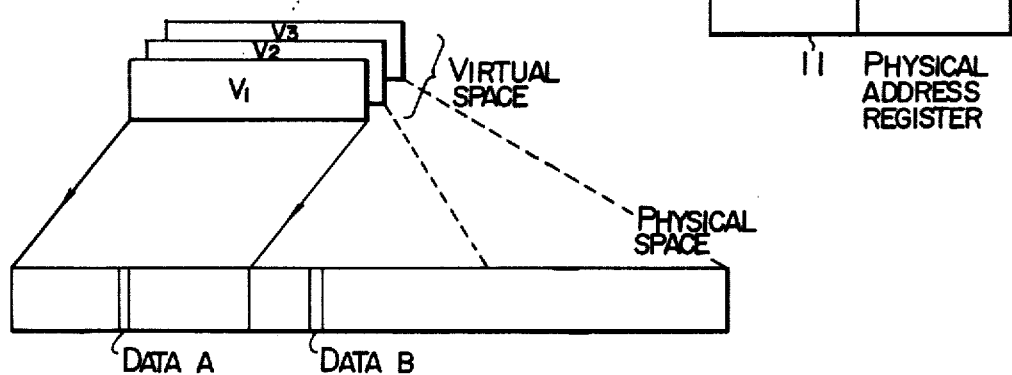
FIGS. 2 and 3 respectively are a view and a flow chart for explaining need of address expansion.
Figure 3:
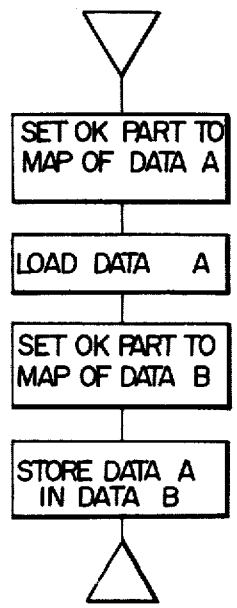

In the minicomputer having the above-described circuit arrangement, the number of virtual addresses is at most 64K. Therefore, the changing-over of a map is required when a space larger than 64K words must be treated on the basis of one program. This can be realized by changing the OK part 6 of PSW. For example, in the case where both data A and data B cannot be accommodated within one logical space of at most 64K words it is desired to transfer the content of the data A into the data B when a physical space is accessed from a virtual space including $V_1, V_2, V_3, \ldots$, as shown in FIG. 2, the setting of the OK part of PSW to a map must be made twice, that is, the setting to the map of the data A and then the setting to the map of the data B must be made. To make a reference to or access a space larger than 64K words is absolutely necessary in an executive program and is indispensable in an on-line system having a large capacity of data. In such cases, the above-described procedure is inefficient as well as laborious in that the programming must be made taking account of which map is now used.

This problem of inefficiency and labor as in the case where it is necessary to make a reference to a space larger than 64K words in a 16-bit minicomputer is eliminated by the present invention.

In general, the address of an operand in a 16-bit minicomputer is obtained as follows. For an instruction including an OP part indicative of an operation code, a B part indicative of the base register number, an X part indicative of the index register number and an address (ADDR) part, the contents (16 bits) of the registers specified by the B and X parts and the content (16 bits) of the ADDR part are added to construct a virtual address of 16 bits. The address of a register of a mapping register arrangement is then specified by the upper 6-bit portion of the 16-bit virtual address and the IK and OK parts of the PSW. The content (10 bits) of the specified mapping register and the lower 10-bit portion of the virtual address are juxtaposed to produce a 20-bit physical address. In such addressing, the access to a space larger than 64K words is impossible on the basis of one instruction. Namely, such an access requires the change of the OK part of the PSW and this cannot be carried out by means of one instruction.

In accordance with the present invention, two ways of addressing are employed. The above-described addressing is applied to a first kind of instruction. For a second kind of instruction, a virtual address of 16 bits is produced by the adding operation of the content (16 bits) of a register specified by the X part of the instruction and the ADDR part of the instruction. Further, a special base register or bank register is specified by the B part of that instruction. The content (4 bits) of the specified bank register is juxtaposed with the most significant six bits of the virtual address to address the mapping register, thereby avoiding the need to refer to the PSW. In the case of the second kind of instruction, a space larger than 64K words is directly accessible on the basis of one instruction. The address of a mapping register is specified by the upper 6-bit portion of the 16-bit virtual address and the content (4 bits) of the bank register and the content (10 bits) of the specified mapping register is juxtaposed with the lower 10-bit portion of the 16-bit virtual address to produce a physical address of 20 bits.

Preferred embodiments of the present invention will be now described with reference to FIGS. 4 to 8.

FIGS. 4 and 5 are block diagrams for explaining the usual addressing scheme and an expanded addressing scheme as employed in the present invention, respectively. Reference numeral 12 represents an instruction register which includes an OP part 13 indicative of an instruction operation code, a B part 14 indicative of the base register number, an X part 15 indicative of the index register number, an S bit part 16 indicative of a first or second kind of instruction, that is, specifying whether a usual or expanded addressing should be used, and an address (ADDR) part 17. The word "extended addressing" means that a virtual address space is expanded and a space larger than 64K words is directly accessable or referrable on the basis of one instruction. For the sake of understanding, an example of data values is illustrated in the blocks of FIGS. 4 and 5.

Referring to FIG. 4, the usual addressing operation will be explained with respect to a 16-bit minicomputer. A virtual or logical address of 16 bits represented by $(B)+(X)+ADDR$ is obtained through an adder 19. (B) and (X) represent the contents of base and index registers in a base/index register arrangement 18 specified by the B and X parts of the instruction, respectively. The virtual address is set in a virtual address register 2. The address of a mapping register in a well known mapping register arrangement 8 is specified by the upper 6-bit portion 3 of the logical address and the instruction/operand key (K) part (also called the address key or instruction space key) 20 of the PSW 1. The content (10 bits) of the specified mapping register representing a physical page on the physical memory space is juxtaposed with the lower 10-bit portion of the 16-bit logical address (representing a location in a physical page on the physical memory space) to produce a physical address of 20-bits.

Figure 8:
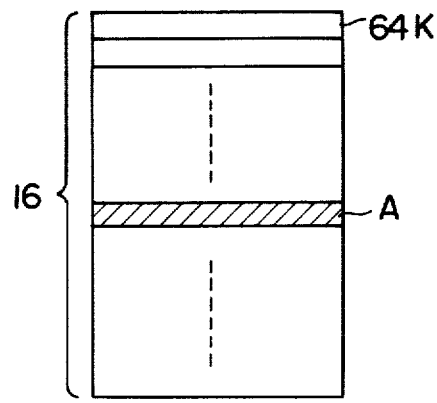
FIG. 8 is a view for explaining areas which are referrable or accessable by the usual addressing and the expanded addressing.

Referring to FIG. 5, an expanded addressing operation will be explained. The B part of the instruction specifies a register in a special base (SB) or bank register arrangement 21 in the case of the expanded addressing though it specifies a register in the base/index register arrangement 18 in the case of the usual addressing operation. The content of the special base (SB) register corresponds to the K part of PSW in the usual addressing operation and is indicated as an SBK part (key part of SB register) 22 in FIG. 5. A virtual address of 16 bits represented by $(X)+ADDR$ is obtained through the adder 19. The content (4 bits) of the specified SB register and the upper 6-bit portion 3 of the virtual address in the virtual address register 2 constitute the address of a register in the mapping register arrangement 8. The content (10 bits) of the specified mapping register is juxtaposed with the virtual address in the virtual address register 2 to produce a physical address of 20 bits. In accordance with this expanded addressing operation, a logical address of 20 bits is provided by 16 bits of $(X)+ADDR$ and 4 bits of the SB register so that a space larger than 64K words can be accessed. Namely, though only a space A of at most 64K words in FIG. 8 showing the mapping register arrangement is accessable on the basis of one instruction in accordance with the usual addressing, all spaces can be directly accessed on the basis of one instruction in accordance with the expanded addressing operation.

The above-described usual addressing and expanded addressing operations are illustrated by a flow chart in FIG. 6. In the illustrated example, the usual addressing is carried out when the S bit is "0", while the expanded addressing is carried out when the S bit is "1".

FIG. 7 shows a circuit arrangement as an embodiment of the present invention for realizing the functions intended in FIGS. 4 to 6. In FIG. 7, reference numeral 24 represents a selector which selects, on the one hand, both the B part 14 and the X part 15 of the instruction, or, on the other hand, only the X part 15, to deliver the selected one to the base/index register arrangement 18. The selector 24 sequentially selects the B and X parts when the S bit of the instruction is "0" and selects only the X part when the instruction is "1". Numeral 23 represents a selector which selects the ADDR part 17 of the instruction or the output of the virtual address register 2 to deliver the selected one to the adder 19. When the S bit is "0", a virtual or logical address represented by (B)+(X)+ADDR is obtained. Namely, in a first step, the selectors 23 and 24 select the ADDR and X parts of the instruction, respectively. An adding operation of (X)+ADDR is carried out in the adder 19. In a second step, the selectors 23 and 24 select the output of the virtual address register 2 and the B part of the instruction, respectively. An adding operation of (B)+[(X)+ADDR] is carried out in the adder 19. When the S bit is "1", on the other hand, the selector 24 selects only the X part of the instruction and the selector 23 selects only the ADDR part of the instruction. As a result, a virtual address represented by (X)+ADDR is obtained through the adder 19.

Numeral 25 represents a selector which selects the K part 20 of the PSW 1 in the case of S bit="0" and the SBK part 22 of the SB register 21 in the case of S bit="1" to deliver the selected one to the mapping register arrangement 18. Thus, an expanded addressing is possible when the S bit is "1".

Further explanation of the selectors 23, 24 and 25 are omitted since the construction of those selectors will be apparent to those skilled in the art from the foregoing.

The above embodiment has been described with respect to the case where (B)+(X)+ADDR having a double modification of (B) and (X) is obtained when it is desired to access a space equal to or smaller than 64K words. When it is desired to access a space larger than 64K words, (X)+ADDR having a single modification of (X) is derived, which results in some lack of flexibility. However, this will give rise to no large hindrance since there exist computers having a single modification for addressing, as a matter of fact.

Though an instruction has included an S part in the above embodiment, the present invention is applicable to the case where the S part is not included. For example, the same effect can be accomplished by having only a special instruction bear a function equivalent to the S part. More particularly, the expanded addressing may be carried out when the OP code or part of the special instruction indicates that addressing. In such a case, the OP code of any instruction is recorded into a decoder through a register and the decoder decodes the OP code and provides an output for the expanded addressing, for example, when all bits of the OP code are "0" or "1". The decoder output is connected with the selectors 23, 24 and 25 of FIG. 7 in a manner similar to the connection of the S part with those selectors.

Though the present invention has been described mainly with respect to the application to a 16-bit minicomputer, the invention is not limited to the specified number of bits and is widely applicable to a data processing system employing a virtual addressing.

We claim:

1. An address conversion method for a data processing system in which a logical address is produced by processing an instruction which includes a first portion indicative of whether the instruction is a first or second kind of instruction, and in which a physical address representative of one of plural addressable storage locations in a physical memory space is produced by means of the logical address through mapping register means which store contents specifying pages of said physical memory space, said method comprising producing the physical address by adding in the case of the first kind of instruction the contents of a first base register and the contents of an index register specified by respective second and third portions of the instruction to a fourth portion of the instruction comprising an address part of the instruction to form a logical address, addressing the mapping register means with an address corresponding to the juxtaposition of an upper bit portion of the logical address and a program status word, and then juxtapositioning the addressed contents of said mapping register means with a lower bit portion of the logical address; and while in the case of the second kind of instruction producing the physical address by adding the contents of the index register specified by the third portion of the instruction and the fourth portion of the instruction comprising the address part of the instruction to form a logical address, addressing a second base register with the second portion of the instruction, addressing the mapping register means with an address corresponding to the juxtaposition of an upper bit portion of the logical address and the addressed content of said second base register, and then juxtapositioning the addressed contents of said mapping register means with a lower bit portion of the logical address.

2. An address conversion unit for a data processing system in which physical addresses representative of a plurality of addressable storage locations in a physical memory space are generated through mapping by means of logical addresses produced by processing instructions each of which includes a first portion indicative of a first or second kind of instruction, a second portion indicative of the base register number, a third portion indicative of the index register number and a fourth portion in the form of an address part, said address conversion unit comprising:

base/index register means addressed by the second and third portions of the instruction when the instruction is of the first kind and addressed only by the third portion of the instruction when the instruction is of the second kind for reading out the contents of addressable storage locations therein;

base register means addressed by the second portion of the instruction when the instruction is of the second kind for reading out the contents of addressable storage locations therein;

means for controlling the routing of said second and third portions of the instruction selectively to said base register/index register means and said base register means on the basis of the first portion of said instruction;

address register means including an adder for generating the sum of the addressed content of said base/index register means and the fourth portion of the instruction said sum to hold said sum as a logical address;

mapping register means operatively connected to receive as an address a part of a program status word and an upper bit portion of said logical address when the instruction is of the first kind and operatively connected to receive as an address the addressed content of said base register means and the upper bit portion of said logical address when the instruction is of the second kind for selectively reading out the contents of one of a plurality of addressable registers therein;

means for controlling the routing of the contents of said base register means and said part of the program status word selectively to said mapping register means on the basis of the first portion of said instruction; and means for juxtapositioning the content of an addressed register in said mapping register means and the remaining lower bit portion of said logical address to generate a physical address.

3. An address conversion unit according to claim 2, wherein the first portion of the instruction contains an instruction code part and a bit part which specifies whether the instruction is of the first or second kind.

4. An address conversion unit for use in a data processing system having a physical memory space made up of a plurality of addressable storage locations which are identified by physical addresses, said address conversion unit comprising:

(a) an instruction register for storing a given instruction word, said instruction including a first field indicative of the code of an operation to be performed in said system, a second field indicative of the base register number, a third field indicative of the index register number, a fourth field indicative of whether usual addressing or expanded addressing should be used, and a fifth field in the form of an address part;

(b) a program status word register in which an address key is stored;

(c) base/index register means including a plurality of base and index registers whose addresses are specified by said second and third fields of said instruction register, respectively, and which hold respective numerical contents to be combined with the address part of said instruction register to form a virtual address;

(d) special base register means connected to receive as an address said second field of said instruction register for reading out numerical contents to be combined with the address part of said instruction register to form a virtual address;

(e) first selector means having a first and second inputs connected to receive said second and third fields of said instruction register, respectively, a control input connected to receive said fourth field of said instruction register, and an output connected to the input of said base/index register means, said first selector means being responsive to the content of said fourth field of said instruction register at its control input for selecting both said second and third fields of said instruction register in the case of the usual addressing and only said third field of said instruction register in the case of the expanded addressing for reading out the content of the selected one to said base/index register means;

(f) a virtual address register;

(g) second selector means having a first input connected to receive said fifth field of said instruction register, a second input connected to receive the output of said virtual address register, and a control input connected to receive said fourth field of said instruction register, said second selector means being responsive to the content of said fourth field of said instruction register at its control input for selecting both said fifth field of said instruction register and said output of said virtual address register in the case of the usual addressing and only said fifth field of said instruction register in the case of the expanded addressing;

(h) an adder having a first input coupled to receive the addressed content of said base/index register means and a second input coupled to receive the output of said selector means for adding said respective contents to transmit the added result to said input of said virtual address register as a virtual address, said virtual address including an upper bit field and the remaining lower bit field;

(i) third selector means having a first input connected to receive said address key of said program status word, a second input connected to receive the output of said special base register means, and a control input connected to receive said fourth field of said instruction register, said third selector means being responsive to the content of said fourth field of said instruction register at its control input for selecting said address key of said program status word in the case of the usual addressing and the output of said special base register means in the case of the expanded addressing;

(j) mapping register means having a first input connected to receive the output of said third selector means and a second input connected to receive the content of said upper bit field of said virtual address register, said mapping register means including page registers whose contents specify pages in said physical memory space; and (k) a physical address register connected to receive the output of said mapping register means in a first portion thereof and a lower bit field of said virtual address register in a second portion thereof for providing a physical address representative of one of said addressable storage locations in said physical memory space.

5. An address conversion unit according to claim 4, wherein said fourth field of said instruction register is contained in said first field of said instruction register.

* * * * *